United States Patent [19]

Rothon et al.

[11] Patent Number: 4,563,274

[45] Date of Patent: Jan. 7, 1986

[54] SEPARATION SYSTEM INCLUDING A FLOATATION TANK HAVING LEVEL CONTROL MEANS

[75] Inventors: Stephen Rothon, South Woodford; Ronald Collis, Sutton, both of England

[73] Assignee: Haden Drysys International Limited, London, England

[21] Appl. No.: 642,193

[22] Filed: Aug. 20, 1984

[30] Foreign Application Priority Data

Sep. 12, 1983 [GB] United Kingdom ............... 8324354

[51] Int. Cl.⁴ .............................................. B01D 21/24
[52] U.S. Cl. .................................... 210/101; 210/104; 210/138; 210/143; 55/228
[58] Field of Search ............... 210/101, 104, 103, 138, 210/143, 709; 55/227, 228

[56] References Cited

U.S. PATENT DOCUMENTS 2,994,432  8/1961  Schluter ............................. 210/101
3,755,804  8/1973  Johnson ............................. 210/104
4,100,066  7/1978  Bloomer et al. .................... 210/104
4,261,707  4/1981  Bradshaw ............................ 55/228

Primary Examiner—John Adee
Attorney, Agent, or Firm—Krass & Young

[57] ABSTRACT

An aqueous solution carrying paint solids is fed through an inlet into a floatation tank. The clean liquid exits through an orifice whose size is controlled by a movable gate. The level of the liquid within the tank is sensed by an ultrasonic rangefinder and the distance signals output from this rangefinder are fed to an electronic controller. During normal operation, this controller periodically supplies power signals to an electric actuator to adjust the position of the gate whereby the level of the liquid in the tank can be maintained substantially at the a first predetermined level. The controller may also include means for causing the liquid to rise to a second predetermined level after a preset time such that the paint solids are transferred over a weir into a collecting vessel. Thereafter the liquid level is caused to rapidly drop and is again maintained at the first level.

23 Claims, 3 Drawing Figures

SEPARATION SYSTEM INCLUDING A FLOATATION TANK HAVING LEVEL CONTROL MEANS

BACKGROUND TO THE INVENTION

The present invention relates to a system for separating matter from a support liquid in which it is suspended.

For example, the system of the invention can be used for separating waste paint solids from an aqueous medium which has been used to wash paint solids from the air exhausted from a paint spray booth.

U.K. Pat. No. 1,540,723 describes apparatus for accumulating waste paint solids which generally comprises a floatation tank having an inlet near its base for a liquid medium, for example, an aqueous solution, containing the paint solids in suspension. The liquid with the paint solids is continuously pumped into the tank through this inlet and is continuously removed through an outlet provided in the tank. The rate of entry and removal of liquid is controlled so that a head of liquid is formed in the tank above the inlet and outlet and liquid flowing through the tank is permitted a sufficient residence time within the tank to enable paint solids to float upwardly to the surface, where they accumulate and form a raft. This raft of accumulated paint solids is removed from time to time by causing the raft to pass over a weir provided at one side of the tank.

The disclosure in U.K. Pat. No. 1,540,723 suggests that sonic detectors might be provided to determine the level of the raft of accumulated paint solids within the vessel.

Several features of the system and its operation assist in the formation of the paint raft. Thus, if the liquid is aerated, bubbles of air will attach to the paint solids and thus ensure that they float more readily. Furthermore, the inlet is generally upwardly directed so that the incoming stream of liquid is directed towards the surface of the liquid within the tank. In addition, the velocities of the liquid flow throughout the system are arranged such that the paint solids are encouraged to rise to the surface and form the raft without re entrainment and downward movement.

The applicants have now found that a system as described in the above identified UK Patent operates most effectively and efficiently if the significant liquid levels can be maintained at predetermined values even if the system is subjected to changes which cause alteration in these levels. Thus, changes in the aeration of the liquid, for example by adding chemicals thereto, changes the levels. In addition, debris in the system can alter flow rates which leads to changes in the levels. Level changes can also be caused by liquid loss at local points and/or by changes in the temperature of the liquid.

Of course, it is known to prevent the level of liquid in a tank from rising above a predetermined level. Thus, types of float valves are described in U.K. Pat. Nos. 1,327,991 and 1,559,517 and are arranged to open a drain passage when the liquid in the tank rises to the predetermined level. The liquid then drains away. The cycle is repeated when liquid arriving subsequently into the tank also attains the predetermined level. UK Pat. Nos. 1,604,795, 2,065,336B and 2,107,204 also show systems preventing liquid rising above a predetermined level, but in these systems the float valves are replaced by sensors in contact with the liquid arranged to actuate valves on the drain passages. None of these earlier systems is able to maintain a liquid constantly at a predetermined level.

SUMMARY OF THE PRESENT INVENTION

The present invention provides a level control apparatus for a floatation tank which controls at least one of the significant levels therein and thereby enhances the efficiency of the system.

According to the present invention there is provided a system for separating matter from a support liquid in which it is suspended, comprising a floatation tank having an inlet and an outlet, supply means for supplying the support liquid and the suspended matter to said inlet, and gate means movable to vary the size of said outlet, and further comprising sensor means for sensing the level of the at least one interface within the system, and level control means responsive to said sensor means and arranged to cause movement of said gate means when the sensed level or levels differ from predetermined values.

As the system of the invention includes level control means, at least one of the significant levels of the system can be controlled. This enhances the efficiency of the system.

The most significant level is that of the surface of the contents of the floatation tank, that is, the interface of the support liquid, or of the suspended matter, or of any foam produced with air. In an embodiment, the sensor means is arranged to sense this level directly, and the level control means is arranged to maintain this level at a predetermined value by causing movement of the gate means whenever the sensed level differs from the predetermined value.

Additionally or alternatively, the level of the liquid/air interface at a selected point within the system can be monitored. For example, the level of the liquid within the supply means is significant and can be controlled. Similarly, the liquid/solid interface at a selected point within the system can be monitored. The level of the liquid/solid interface within the floatation tank is significant and can be controlled. Furthermore, the level of this interface enables the thickness of the raft of solids being built up to be determined.

The sensor means may comprise one or more direct contact or non-contact sensors. Preferably, the or each sensor is a non-contact sensor, that is, does not come directly into contact with either the liquid or the suspended matter. For example, the sensor means may comprise at least one rangefinder spaced from an interface and arranged to determine its spacing from that interface. The rangefinder may be an ultrasonic rangefinder, a laser rangefinder, an infra red rangefinder, or indeed any suitable device including energy emitting means.

The level control means preferably comprises an actuator connected to the gate means to cause movement thereof, means for comparing the level or levels sensed by said sensor means with preset values, and means for operating said actuator when said sensed level or levels differ from said preset values. The actuator may be operable in response to electrical operating signals supplied by said operating means. For example, the actuator may be an electrically operated actuator or a pneumatically or hydraulically operated actuator controlled by way of solenoid valves.

Thus, the comparing means would generally be a comparator whose output is arranged to enable the supply of operating signals to said actuator. Preferably, the level control means includes a timing circuit arranged to enable operation of the comparator at predetermined intervals.

In this respect, it is preferred that the level of the interface within the floatation tank be continuously monitored. However, if the level of the interface is continuously adjusted, this can cause "hunting". Accordingly, it is preferred that the operating signals supplied to the actuator only have a preset duration. Thus, each time the comparator enables the supply of electrical operating signals to the actuator, these signals would have a restricted duration which, of itself, inhibits hunting.

In a preferred embodiment the level control means is set up to maintain the level of the interface within the floatation tank at a first predetermined level for a preset period. In addition, the control means is arranged at the end of that preset period to cause the gate means to reduce the size of the outlet from the floatation tank such that the level of the interface within the floatation tank rises above the level of a weir of the floatation tank communicating the tank with a collection vessel. Thus, at the end of the preset period the rise in the liquid level will cause the matter floating on the support liquid to be transferred over the weir.

Preferably, the level control means includes a shut down device to prevent operation of the actuator if the sensed level falls below a preset minimum value.

It is also preferred that the level control means includes a manual override circuit enabling manual control of the actuator if required.

BRIEF DESCRIPTION OF THE DRAWINGS

Embodiments of the present invention will hereinafter be described, by way of example, with reference to the accompanying drawings, in which.

DESCRIPTION OF PREFERRED EMBODIMENTS

Figure 1:
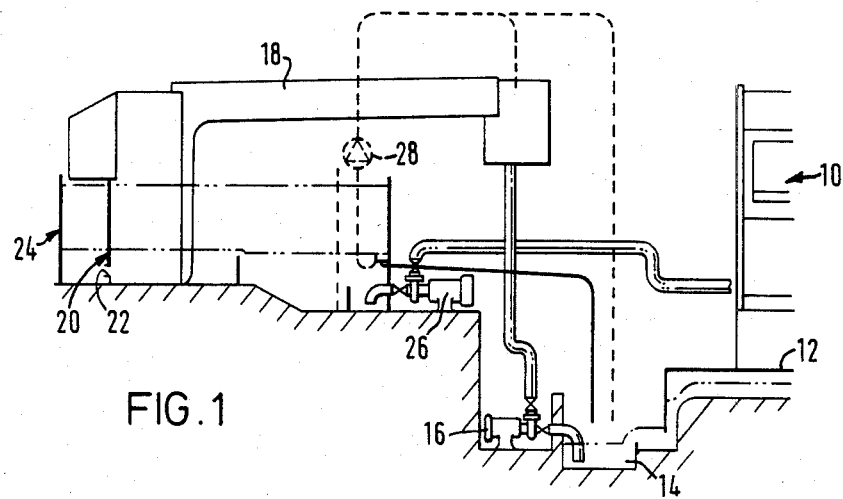
FIG. 1 shows a schematic view of a system for removing paint solids from an aqueous medium discharged from a paint spray booth.

FIG. 1 shows schematically a system for removing waste paint solids from the aqueous medium, which is generally water, discharged from a paint spray booth. Thus, the paint laden air exhausted from a paint spray booth, indicated at 10, is drawn through a washer (not shown) where finely atomised water is mixed with the paint laden exhaust air. In this manner, a high proportion of the paint load is removed from the air.

The water used is chemically treated to take the stickiness out of the paint and to minimise fouling of the washer.

The paint laden aqueous solution exhausted from the washer flows through an outlet duct 12 into a tank 14. A torque flow solids handling pump 16 lifts the paint laden aqueous solution into an inlet duct 18 from where it flows into a floatation tank diagrammatically indicated at 20. The paint solids are separated from the liquid in the tank 20 as will be described in more detail below. The liquid exits from the tank 20 through an exit orifice 22 into a liquid level tank 24. The clean liquid leaving the floatation tank 20 is then returned by way of a pump 26 to the washer (not shown) of the paint spray booth 10. FIG. 1 also shows an additional pump 28 arranged to pump clean liquid to the tank 14 and to the inlet duct 18 in order to ensure the correct liquid levels within the system, and improve collection efficiency by recirculating paint scum.

The system shown in FIG. 1 employs pump both to circulate the liquid and to lift it to provide a hydraulic head which is sufficient to maintain the liquid in the floatation tank 20 at a required level. The use of the pumps means that there is substantially no restriction on the location of the floatation tank relative to the paint spray booth. However, if the floatation tank can be located below the level at which the liquid exits from the paint spray booth, pumps are obviously not necessary to transfer the paint laden aqueous material to the floatation tank nor to generate the necessary hydraulic head.

Figure 2:
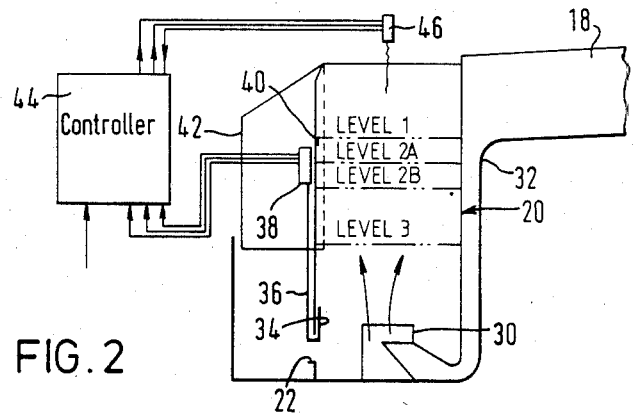
FIG. 2 shows the floatation tank of the system of FIG. 1 and schematically indicates control apparatus for the floatation tank.

An embodiment of the floatation tank is shown in FIG. 2. The tank 20, which is of generally rectangular cross section, has an upwardly directed inlet 30 which is connected to the inlet duct 18 by way of an inlet conduit 32. It will be seen that the inlet conduit 32 extends vertically downwardly from the inlet duct 18 such that the inlet 30 is near the base of the floatation tank 20. The exit orifice 22 of the tank 20 is also situated near the base thereof. A sliding gate 34 is provided and is movable vertically such that it can partially or completely block the orifice 22. Thus, the position of the gate 34 determines the volume flow rate at which liquid flows out of the floatation tank 20.

In the embodiment illustrated in FIG. 2, the sliding gate 34 is connected for movement by a rod 36 of an actuator 38. The actuator 38 may be electrically operated as indicated in the illustrated embodiment or a pneumatically or hydraulically operated cylinder controlled by solenoid valves.

In normal use, the gate 34 is positioned so that it provides a sufficient resistance to the flow of liquid therethrough that the liquid remains at the required level in the floatation tank 20. In the embodiment illustrated, it is required that the surface of the liquid within the tank 20 be maintained at level 2A. As the paint laden liquid enters the tank 20 it is directed upwardly by the inlet 30 and the paint solids float to the surface where a raft is accumulated.

After a certain time, or when this raft reaches a certain thickness, it is required to remove the paint solids from the floatation tank.

In this respect the floatation tank has a weir 40 at one side thereof which communicates the tank 20 with a collection vessel indicated at 42. Normally, a basket (not shown) with a porous plastics material liner, will be housed in the vessel 42 to receive any material transferred over the weir.

When the raft is to be removed from the floatation tank 20 the gate 34 is moved to close the exit orifice 22 of the floatation tank 20. Accordingly, the level of the liquid within the floatation tank 20 will rise and the raft of paint solids will be transferred over the weir 40 into the collection vessel. In this respect, to transfer all of the raft it is necessary that the surface of the liquid in the floatation tank 20 rises to the level 1, which is schematically indicated in FIG. 2. Once the transfer has been completed, the orifice 22 is reopened such that the level of the liquid within the floatation tank falls and the system is readjusted such that the surface of the liquid is again at level 2A.

For the system to operate most effectively it is important that during formation of the raft the surface of the liquid within the floatation tank 20 is maintained at level 2A. This ensures that there is sufficient vertical height of liquid in the tank 20 to engender efficient formation of the raft.

Figure 3:
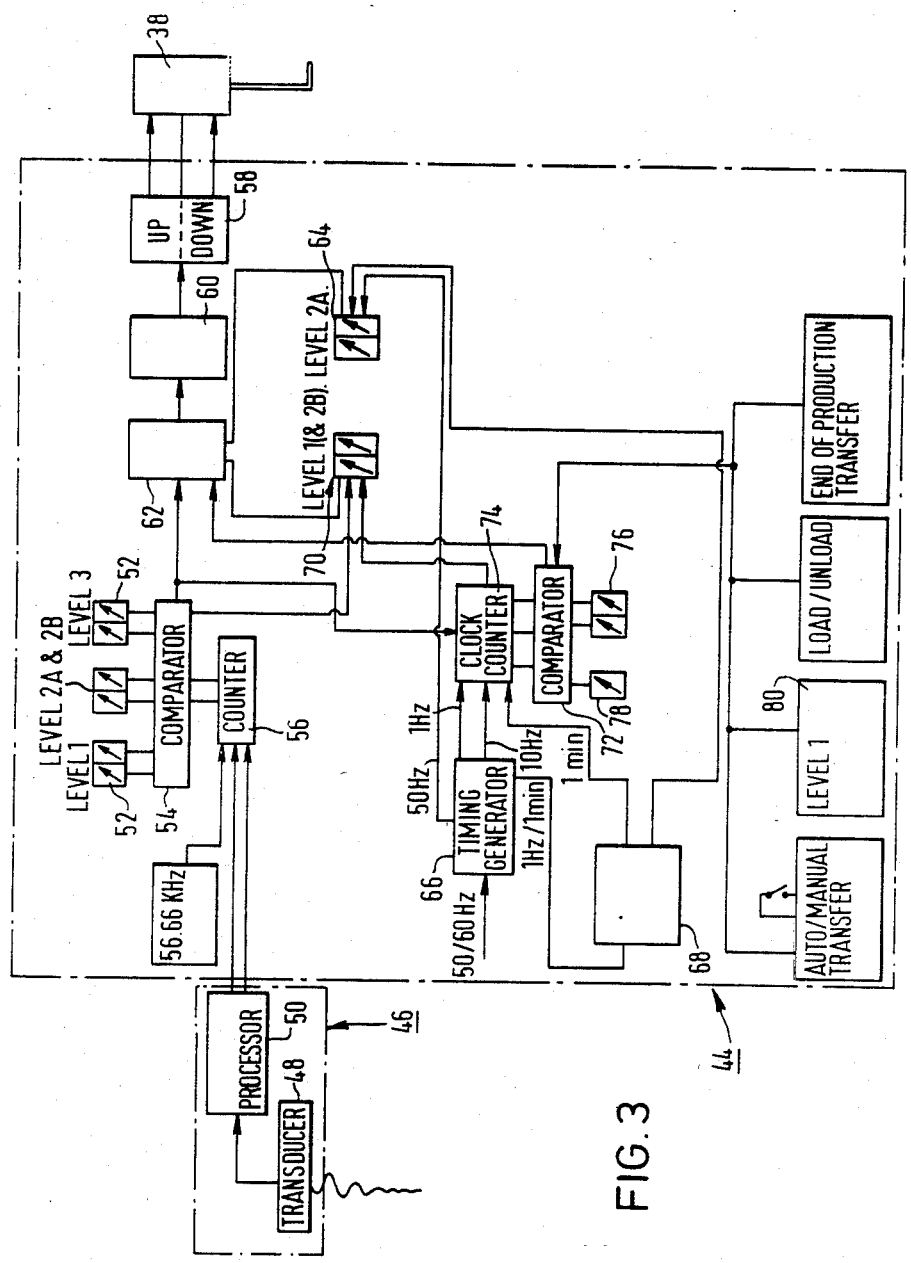
FIG. 3 shows a block diagram of the control apparatus of FIG. 2.

However, there are many factors which can alter the liquid level within the tank. Accordingly, as shown in FIG. 2, a level controller 44 is provided and is arranged to adjust the position of the gate 34 to maintain the liquid level substantially at level 2A. In this respect, the controller 44, which is shown in more detail in FIG. 3, is connected to a rangefinder 46 arranged to provide information as to the position of the surface of the liquid in the tank 20 such that the controller 44 can operate the actuator 38 in response to the information from the rangefinder 46.

The rangefinder 46 is arranged to emit energy which is reflected back by the top surface of the liquid in the tank 20 such that signals representative of the distance between the rangefinder 46 and the top surface of the liquid are provided. In the embodiment shown in FIG. 3, the rangefinder 46 is an ultrasonic rangefinder which comprises an ultrasonic transducer 48 controlled by a processor 50. In known manner, the rangefinder feeds distance signals to the controller 44.

Periodically, the distance signal from the rangefinder 46 will be compared with a preset value. If the distance signal differs from the preset value, the actuator 38 will be operated to move the gate 34 and hence cause a change in the level of the liquid within the tank 20.

Four preset levels are entered into level switches 52 during the setting up of the circuit. As is shown in FIG. 2, level 1 is substantially at the level of the weir, level 2A is the normal accumulate level, and level 3 is a low level below which the liquid should not be allowed to fall during normal operation of the system. Level 2B enables the system to have different response times in different circumstances as will be explained further below.

The set levels can be read by a comparator 54 which is also connected to receive the distance readings from the rangefinder 46 by way of a counter 56.

The actuator 38 is connected by way of a manual override circuit 58 and output circuits 60 to an integrating processor 62. This processor 62 is connected to the output of the comparator 54. A further input to the processor 62 is also connected to a bank of rotary switches 64. In fact, in this embodiment there are two switches, one of which is the "set interval" switch and controls the time period between the processing of distance signals from the rangefinder 46. This switch is adjustable such that the interval is in the range 0 to 9 minutes.

The other of the switches 64 is the "set travel" switch. It will be seen that these switches 64 receive from a timing generator 66 a signal at a known frequency, in this case 50 hertz, and a further signal by way of a mode selector switch 68 representative of the actual time elapsed. Thus, when the time elapsed signal equals the set interval the integrating processor 62 will be actuated to cause the comparator 54 to compare the distance signal received from the counter 56 with the set level 2A. If the comparison is equal the processor 62 does not produce an output signal. If the two signals are not equal the processor 62 enables the output circuits 60 to cause the actuator 38 to move either up or down. The set travel switch 64 divides the 50 hertz signal from the timing generator 66 by the preset amount and the preset number of cycles of mains power are fed to the actuator 38. Thus, the actuator 38 moves the gate 34 by a predetermined distance. The movement of the actuator 38 then ceases. If the gate 34 has been opened further, the liquid level in the tank 20 will begin to fall, whereas if the gate has been moved in a direction to close the orifice 22, the liquid level in the tank will rise.

When the actual time elapsed again equals the set interval, the distance signals from the rangefinder 46 will again be compared with the preset level of 2A and further movement of the gate 34 will be caused if the sensed level is not equal to the preset level.

It will thus be appreciated that the controller 44 can operate to maintain the surface of the liquid in the tank 20 at the level 2A.

The mode selector switch 68 can be set in one of several positions. In particular, it can be set in a semi automatic position in which the circuit will operate as described above simply to keep the surface of the liquid in the tank 20 at level 2A.

However, if required, the mode selector switch 68 can be set at an automatic position which will cause the controller 44 to automatically cause the transfer of the raft of solids over the weir 40 at preset intervals.

It will be seen that the circuit includes a further comparator 72 connected to a clock counter 74 which receives a real time indication from the timing generator 66 by way of the mode selector switch 68 when this is in its automatic mode. The comparator 72 compares the actual time elapsed with an accumulate time preset on a bank of switches 76. The time preset on these switches 76 will be dependent on the paint loading of the liquid, on the type of raft produced, and on production times in the paint spray booth. Where possible, the switches 76 are preset to give the longest possible accumulate period. Typically, the time set will be between 2 and 8 hours.

When the actual time elapsed is equal to the preset time on the switches 76 the comparator 74 will signal the integrating processor 62 to take input commands from a bank of switches 70 rather than from the switches 64. These switches 70 have been similarly set to give the interval between distance readings and to control the pulses fed to the actuator 38. During a transfer operation it is required that the level of the liquid within the tank rises speedily, and thus the interval set on the switches 70 will be less than that set on the switches 64. Similarly, the travel preset on the switches 70 will enable longer periods of mains power to be fed to the actuator 38. Typically, the switches 64 would be set to cause one distance signal to be read every 3 to 6 minutes and to allow mains power in pulses having a period of 0.06 seconds to 0.12 seconds, which represents a travel of between 0.75 mm to 1.50 mm, to be fed to the actuator 38. Typically, the switches 70 would be set to cause one distance signal to be read every 3 to 6 seconds and to allow mains power in pulses having a period in the range 0.3 to 0.6 seconds, to be fed to the actuator 38 to cause travel of the gate 34 by a distance in the range 3 to 6 mm.

When receiving interval and travel commands from the switches 70 during a transfer operation, the processor 62 will be taking from comparator 54 the results of the comparison between the distance signals from the rangefinder 46 and the preset level 1. Thus, the system will function to close the orifice 22 quickly such that the liquid level in the tank speedily rises to level 1.

When the liquid reaches level 1 the comparator 54 resets the clock counter 74 which then times the actual time elapsed during the transfer. The comparator 74 compares the elapsed transfer time with a preset transfer time entered on switches 78. At the end of the transfer cycle an automatic return cycle is commenced.

It will be appreciated that as the liquid in the tank 20 rises from level 2A to level 1 the solids raft floated on the liquid is transferred over the weir 40 into the collector vessel 42.

At the end of the preset transfer time the actuator 38 is connected by way of the output circuits 60, the processor 62 and the clock counter 74 to the mains supply such that the gate 34 is continuously opened. The liquid level in the tank 20 therefore falls rapidly. Once the liquid level falls below level 2A, the controller 44 once again compares the liquid levels with the set levels to restore the liquid level to level 2A. In this respect, if the level in the tank falls below the level 2B the processor 62 looks at the interval and travel set on the switches 70 such that a quick rise to level 2B can be obtained. However, once the level is higher than level 2B the processor 62 returns to taking the interval and travel from the switches 64. Thus, the liquid is raised from level 2B to level 2A more slowly. This tends to reduce overshoot of the desired liquid level 2A.

It will be seen that the comparator 54 also receives from the switches 52 a preset minimum level, level 3. If at any time the level of the liquid in the tank drops below level 3, the integrating processor 62 immediately immobilises the actuator 38 until the liquid level rises again above level 3. At this time the actuator 38 will be pulsed to return the liquid level to level 2A using both switches 70 and 64 as above.

Preferably, the switches of the circuit have associated displays so that the preset information can be read. Similarly, the clocks and counters will be provided with visual displays. The mode selector switch 68 may have a manual mode in which the control circuit 44 continues to make the necessary comparisons but in which the actuator 38 is not energised thereby. In this mode, the liquid level can be adjusted manually by way of the push buttons 58 using the displayed information.

The invention has been described above with particular reference to the separation of paint solids from the aqueous medium discharged from a paint spray booth. However, it will be appreciated that the controller may be used with floatation tanks employed for any separation operation, for example, for separating solids from liquids, or for separating liquids of differing densities such as oil and water.

In the embodiment described above the rangefinder 46 is described as looking at the surface of the liquid within the tank and thus is looking at the liquid/air, liquid/solid or liquid/foam interface in the tank. Alternatively, the rangefinder 46 could look at the surface of the contents of the tank, i.e. at the liquid/air, solid/air or foam/air interface. Additionally or alternatively, the level of the liquid in the inlet conduit 32 could be controlled. Furthermore, although the illustrated embodiment uses an ultrasonic rangefinder other rangefinders or other types of sensors may be employed. For example, contact devices may be used for signalling the level of the interfaces to be controlled. Of course, there could be some problems with contact sensors where the matter to be separated is sticky and/or opaque.

If required, sensors could be arranged to look at both the surface of the liquid within the tank and the surface of the contents whereby the thickness of the raft could be determined. The controller 44 could be arranged to perform a transfer operation whenever the thickness of the raft reached a predetermined value.

Further functions may be incorporated in the controller 44. Thus, a manual level 1 push button 80 can be provided to cause, in the semi automatic mode selected by the selector switch 68, the liquid level to be raised to and held at level 1. The raft could then be raked manually over the weir 40. Furthermore, in the automatic mode, pressing the level 1 push button 80 is arranged either to raise the liquid to level 1 and maintain it at this level or to start a transfer operation.

Similarly, the controller 44 could be made responsive to a plurality of sensors. For example, the system could be arranged to respond to both the liquid level in the tank and the liquid level in the inlet conduit.

We claim:

1. A system for separating matter from a support liquid in which it is suspended, comprising a floatation tank having a base, an inlet arranged at or near said base, and an outlet arranged at or near said base, supply means for supplying the support liquid and the suspended matter to said inlet, said inlet being arranged to direct the support liquid and the suspended matter upwardly of said floatation tank, and gate means mounted for movement relative to said outlet such that movement of said gate means is arranged to vary the size of said outlet, said system further comprising sensor means arranged to sense the level of a surface of the support liquid and the suspended matter within the system, and level control means responsive to said sensor means and arranged to maintain said surface at a preselected level, said level control means comprising means for comparing the level of said surface with said preselected level, and means arranged to cause movement of said gate means when the level of said surface differs from said preselected level.

2. A system according to claim 1, wherein said sensor means comprises at least one non-contact sensor which is not in direct contact with either the liquid or the suspended matter.

3. A system according to claim 2, wherein the non-contact sensor is a rangefinder spaced from said surface of the liquid or matter within the system and arranged to determine the spacing of the rangefinder from the said surface.

4. A system according to claim 3, wherein the rangefinder is an ultrasonic rangefinder.

5. A system according to claim 1, wherein said level control means comprises an actuator connected to said gate means to cause movement thereof, and means for operating said actuator when the level of said surface differs from said preselected level.

6. A system according to claim 5, wherein said actuator is electrically operated and is responsive to electrical operating signals supplied by said operating means.

7. A system according to claim 5, wherein said actuator is pneumatically or hydraulically operated and is controlled by solenoid valves responsive to electrical operating signals supplied by said operating means.

8. A system according to claim 6, wherein the electrical operating signals supplied to said actuator have a preset duration such that said actuator moves the gate means a predetermined distance.

9. A system according to claim 5, wherein said level control means further comprises a timing circuit arranged to enable operation of said comparing means at predetermined intervals.

10. A system according to claim 5, wherein said surface is within the floatation tank, and said level control means is arranged to maintain the level of said surface at a first predetermined level for a preset period, and wherein at the end of said preset period said level control means is arranged to cause the gate means to reduce the size of said outlet such that the level of said surface within the floatation tank rises.

11. A system according to claim 10, wherein said floatation tank has a weir communicating the tank with a collection vessel, said first predetermined level being below said weir, and wherein after said preset period said level control means is arranged to cause the liquid within the floatation tank to rise such that matter floating on said liquid is transferred over the weir.

12. A system according to claim 10, wherein said level control means further comprises means to prevent operation of said actuator if said surface falls below a predetermined minimum level.

13. A system according to claim 5, wherein said level control means further includes a manual override circuit enabling operation of said actuator under manual control.

14. A system according to claim 1, wherein said sensor means is arranged to determine the level of the surface of said matter within the floatation tank, and wherein said level control means is arranged to cause movement of the gate means in response to said sensor means to maintain the surface of said matter within the floatation tank at a predetermined level.

15. A system according to claim 1, wherein said sensor means is arranged to determine the level of the surface of the support liquid and the suspended matter at a selected part within said supply means, and wherein the level control means is arranged to cause movement of said gate means when the level determined differs from a preset value.

16. A system according to claim 1, wherein said inlet and said outlet are both near the base of the tank, the outlet being at a lower level in the tank than said inlet, and wherein said inlet is upwardly directed.

17. A system for separating matter from a support liquid in which it is suspended, comprising a floatation tank having an inlet and an outlet, supply means for supplying the support liquid and the suspended matter to said inlet, and gate means movable to vary the size of said outlet, said system further comprising sensor means arranged to sense the surface of the matter and the support liquid within the floatation tank, and level control means responsive to said sensor means and arranged to maintain said surface of the matter and liquid at a preselected level, said level control means comprising an actuator connected to said gate means to cause movement thereof, means for comparing the level of said surface with said preselected level, and means for operating said actuator when the level of said surface differs from said preselected level.

18. A system according to claim 17, wherein said actuator is electrically operated and is responsive to electrical operating signals supplied by said operating means.

19. A system according to claim 17, wherein said actuator is pneumatically or hydraulically operated and is controlled by solenoid valves responsive to electrical operating signals supplied by said operating means.

20. A system according to claim 18, wherein the electrical operating signals supplied to said actuator have a preset duration such that said actuator moves the gate means a predetermined distance.

21. A system according to claim 17, wherein said sensor means is arranged to provide electrical output signals representative of the level sensed, and wherein said comparing means comprises a comparator connected to said sensor means by way of a counter, and wherein the output from said comparator is supplied to said actuator by way of a processor.

22. A system according to claim 21, wherein said level control means further comprises a timing generator for providing an output signal at a predetermined frequency, means arranged to receiving said output signal and to generate a signal representative of actual time elapsed, and means for comparing said time elapsed signal with a set value representative of a predetermined time interval and for enabling said processor when said time elapsed equals said predetermined time interval.

23. A system according to claim 17, wherein said supply means is arranged to supply paint laden aqueous medium to said floatation tank.

* * * * *